(12) United States Patent
Andryukov et al.

(10) Patent No.: US 10,566,647 B2
(45) Date of Patent: Feb. 18, 2020

(54) SYSTEM, METHOD, AND APPARATUS FOR BATTERY CELL-STACK COMPRESSION

(71) Applicant: Facebook, Inc., Menlo Park, CA (US)

(72) Inventors: Alex Andryukov, Manassas, VA (US); Jason Wallace, Manassas, VA (US)

(73) Assignee: Facebook, Inc., Menlo Park, CA (US)

(*) Notice: Subject to any disclaimer, the term of this patent is extended or adjusted under 35 U.S.C. 154(b) by 88 days.

(21) Appl. No.: 15/822,539

(22) Filed: Nov. 27, 2017

(65) Prior Publication Data

US 2019/0165408 A1    May 30, 2019

(51) Int. Cl.

| | |
|---|---|
| *H01M 10/04* | (2006.01) |
| *H01M 2/02* | (2006.01) |
| *H01M 2/10* | (2006.01) |
| *H01M 10/42* | (2006.01) |
| *H01M 2/16* | (2006.01) |
| *B64D 27/24* | (2006.01) |
| *H01M 10/48* | (2006.01) |
| *H01M 10/0525* | (2010.01) |

(52) U.S. Cl.
CPC ........ *H01M 10/0468* (2013.01); *B64D 27/24* (2013.01); *H01M 2/0262* (2013.01); *H01M 2/0295* (2013.01); *H01M 2/1077* (2013.01); *H01M 2/1653* (2013.01); *H01M 10/0481* (2013.01); *H01M 10/425* (2013.01); *H01M 10/48* (2013.01); *B64D 2211/00* (2013.01); *H01M 10/0525* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 3,840,009 A | 10/1974 | Michaels et al. | |
| 5,105,088 A | 4/1992 | Boniface et al. | |
| 5,670,272 A | 9/1997 | Cheu et al. | |
| 6,040,085 A | 3/2000 | Cheu et al. | |
| 6,174,595 B1 | 1/2001 | Sanders | |
| 8,507,125 B2 | 8/2013 | Meschter | |
| 9,054,361 B2 | 6/2015 | Christian et al. | |
| 9,478,836 B2 | 10/2016 | Albertus et al. | |
| 9,531,039 B2 | 12/2016 | Heubner et al. | |
| 9,705,156 B2 | 7/2017 | Dorsch | |
| 2005/0110458 A1* | 5/2005 | Seman, Jr. ............ | H01M 2/204 320/114 |
| 2008/0166511 A1* | 7/2008 | Honma .................. | C08G 59/50 428/36.4 |

(Continued)

*Primary Examiner* — Wojciech Haske
(74) *Attorney, Agent, or Firm* — Keller Jolley Preece

(57) ABSTRACT

The present disclosure relates to the manufacture of battery packs/assemblies and more specifically, the manufacture of battery packs/assemblies for use in aircraft. A lightweight battery assembly with cell compression and/or pressure management system is disclosed herein. The battery assembly can employ a composite battery enclosure impregnated with a plurality of primary fibers that define a direction of the composite battery enclosure's tensile strength. A cell-stack can be positioned in the composite battery enclosure such that the composite battery enclosure applies a predetermined pressure upon the cell-stack to compress the cell-stack in the direction of the composite battery enclosure's tensile strength.

20 Claims, 10 Drawing Sheets

(56) References Cited

U.S. PATENT DOCUMENTS

| | | |
|---|---|---|
| 2008/0213659 A1 | 9/2008 | Yamada |
| 2010/0216016 A1 | 8/2010 | Seino et al. |
| 2012/0130714 A1 | 5/2012 | Choi et al. |
| 2013/0189551 A1* | 7/2013 | Imre .................. H01M 2/1077 429/50 |
| 2013/0330577 A1 | 12/2013 | Kristofek et al. |
| 2015/0048783 A1 | 2/2015 | Albertus et al. |
| 2015/0104693 A1* | 4/2015 | Dorsch ............... H01M 2/0245 429/156 |
| 2015/0180089 A1* | 6/2015 | Min ..................... H01M 10/42 429/94 |
| 2015/0236315 A1 | 8/2015 | Hofer et al. |
| 2017/0331323 A1 | 11/2017 | Ehrmantraut |

* cited by examiner

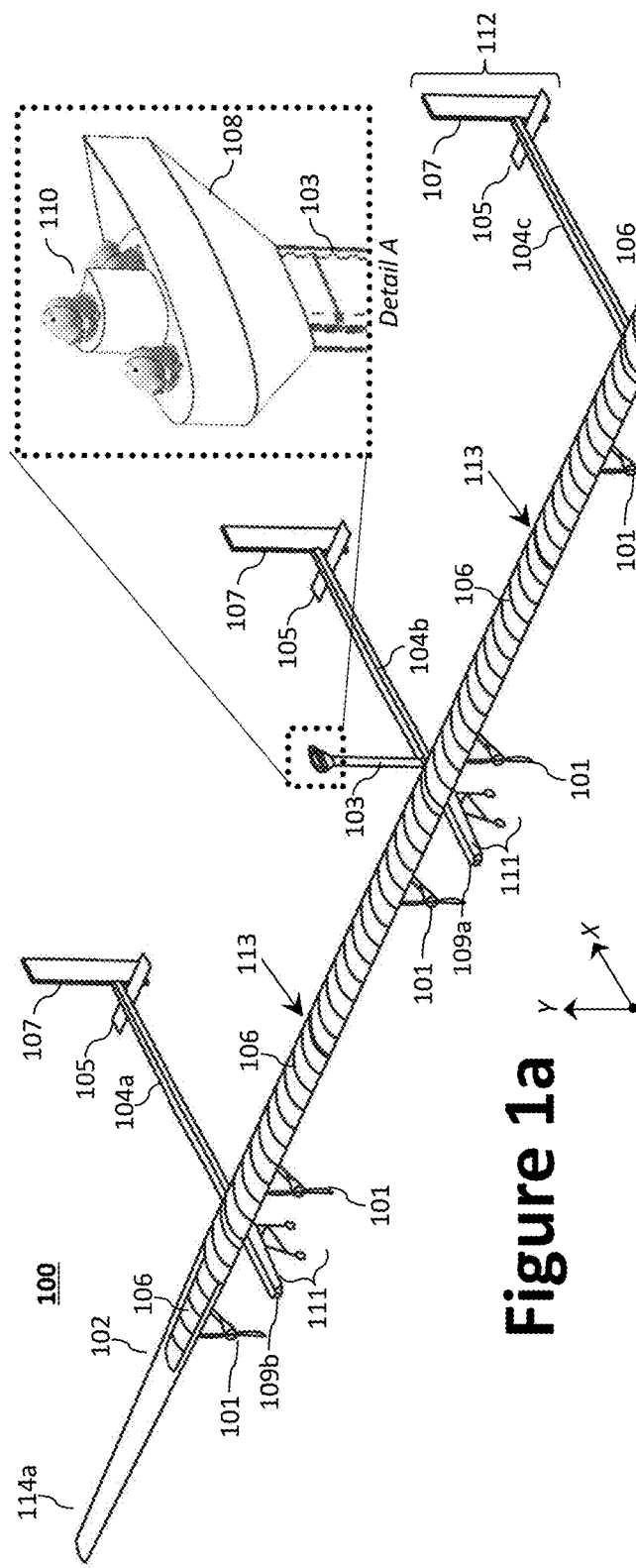
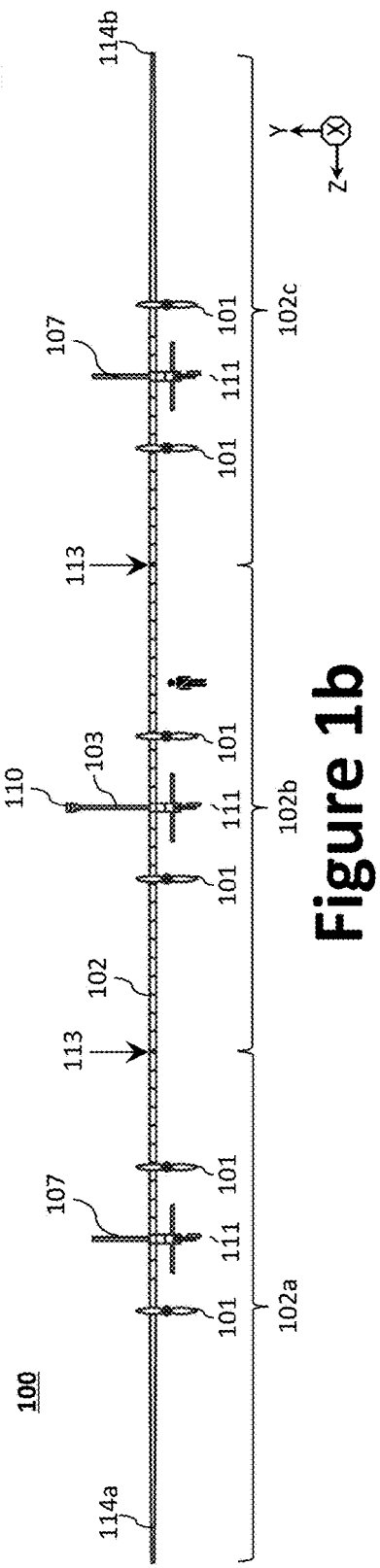
Figure 1a
Figure 1b

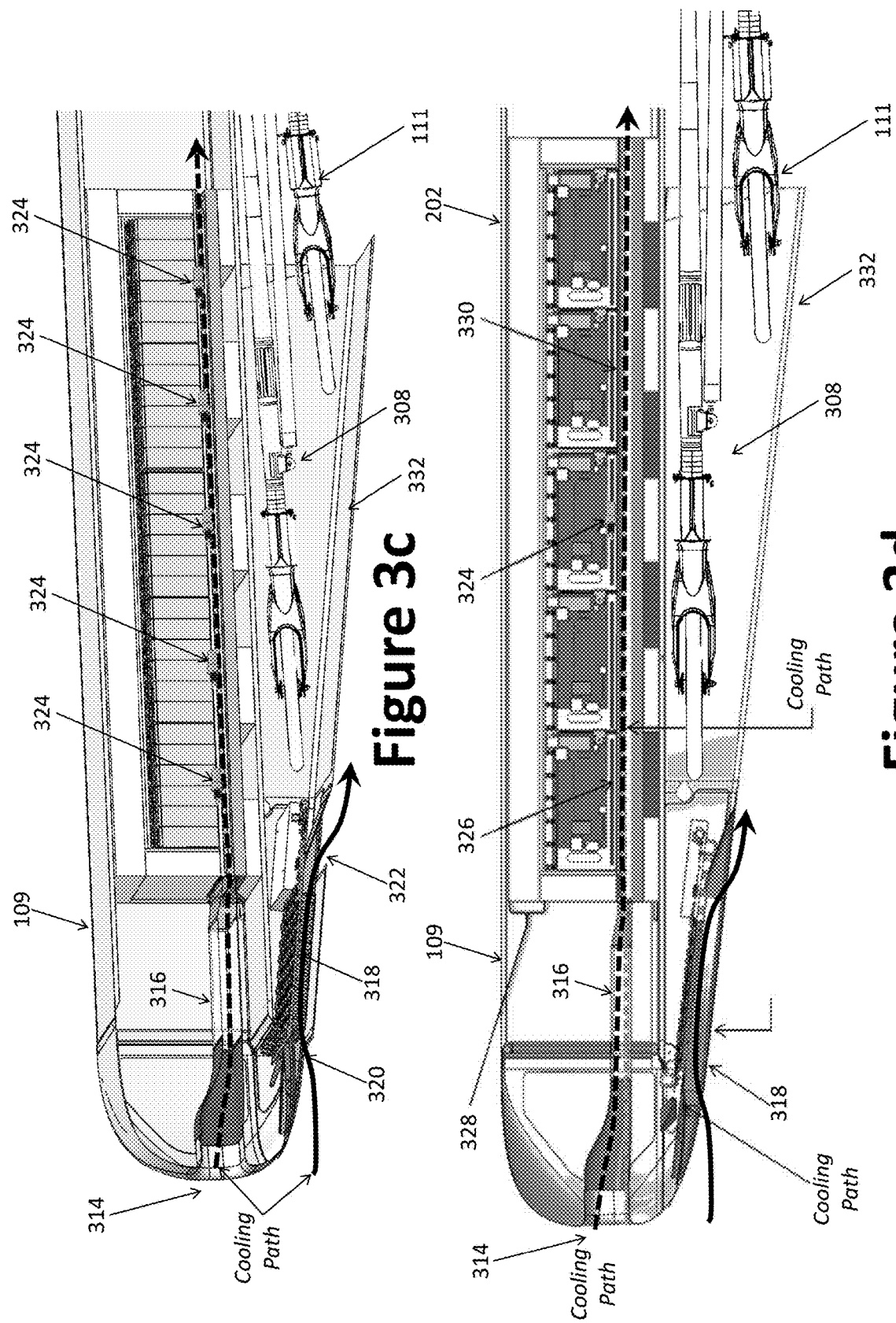

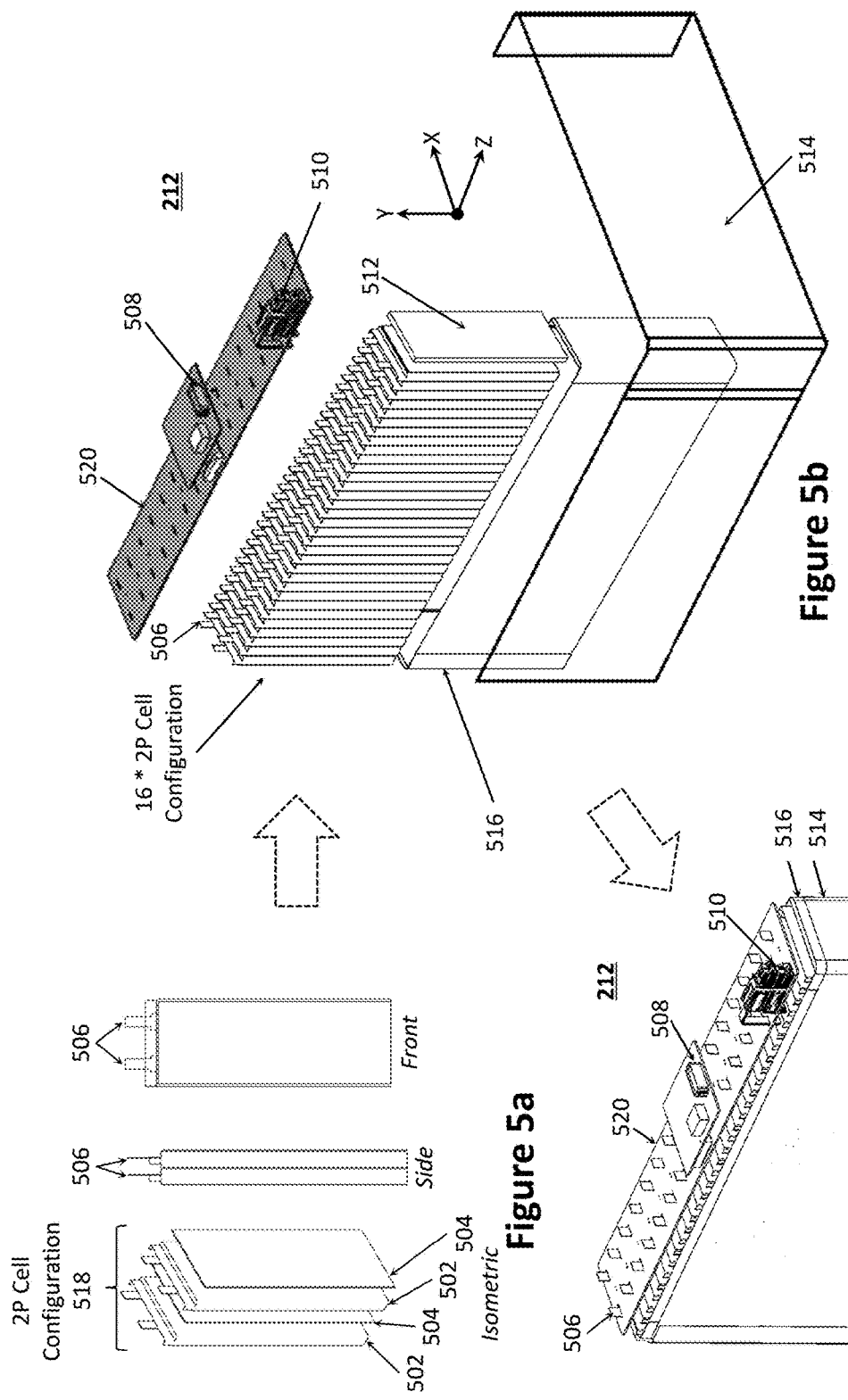

SYSTEM, METHOD, AND APPARATUS FOR BATTERY CELL-STACK COMPRESSION

FIELD OF THE INVENTION

The present disclosure relates to the manufacture of battery packs/assemblies and, more specifically, the manufacture of battery packs/assemblies for use in aircraft.

BACKGROUND

The concept of high-altitude, long-endurance, solar-powered aircraft has been demonstrated by a number of aerial vehicle research projects. Solar power systems typically rely on an array of solar panels that interface with a battery grid (or similar battery systems) through control circuitry, such as a maximum power point tracker. A maximum power point tracker provides a circuit assembly that, in operation, adjusts the load impedance presented to the array of solar panels to achieve a maximum power out of the solar array. The power collected out of the solar array is then stored to the battery packs/assemblies of the battery grid.

A battery pack may employ battery cells of various chemistries. Lithium-polymer cells are higher in specific energy density per unit weight than most other battery chemistries; including nickel cadmium, lead acid, silver oxide, mercury, and alkaline dry cells. Furthermore, lithium-polymer cells have a higher voltage output per cell than many other systems; therefore, fewer cells are needed to achieve a given battery voltage.

Lithium-polymer cells are available in a variety of formats and housings, including prismatic cell battery packs and pouch cell batteries. Unlike prismatic cell battery packs that are typically rigid, pouch cell battery packs employ a flexible pouch with conductive foil tabs to carry the positive and negative terminals from the battery cells to the outside of the pouch. Pouch cell battery packs (or simply, pouch cells) typically experience a performance benefit when pressure is applied perpendicularly to the pouch cell's internal layers (e.g., compressing the cell stack). Preferably, this pressure should remain constant as the pouch cells swell cyclically.

A number of advancements have been made in such battery pressure management. For example, U.S. Pat. Nos. 5,670,272 and 6,040,085, each to Cheu et al., describe battery packaging having, inter alia, a gas spring positioned in a housing structure containing the battery cell assembly. Cheu et al. also describes injection of an expanding compound through a nozzle to the housing to exert pressure on the battery cell assembly. However, such metallic (or plastic) structural methods are excessively heavy (or overly complex) when configured to withstand the necessary applied load over time and, therefore, are not suitable for ultralight aircraft applications.

In view of the foregoing, a need exists for a lightweight battery assembly with a pressure management system or apparatus that can overcome the deficiencies of the prior art. Such a lightweight battery assembly may be employed with ultralight aircraft applications, such as long endurance solar-powered aircraft.

SUMMARY

The present disclosure relates to the manufacture of battery packs/assemblies and, more specifically, the manufacture of battery packs/assemblies for use in ultralight applications and aircraft.

According to a first aspect, a battery pack comprises: a composite battery enclosure impregnated with a plurality of primary fibers that define a direction of the composite battery enclosure's tensile strength; and a plurality of battery cells stacked to define a cell-stack, wherein the cell-stack is positioned in the composite battery enclosure such that the composite battery enclosure applies a predetermined pressure upon the cell-stack to compress the cell-stack in the direction of the composite battery enclosure's tensile strength.

According to a second aspect, a battery pack can be assembled by a method comprising: compressing a cell-stack having a plurality of lithium battery cells to a predetermined pressure; and inserting, into a composite battery enclosure, the cell-stack while maintaining the predetermined pressure, wherein the composite battery enclosure is a composite structure comprising primary fibers that are oriented parallel with a load path imparted on the cell-stack.

According to a third aspect, a battery pack can be assembled by a method comprising: compressing a cell-stack having a plurality of lithium battery cells and two end-plates to a predetermined pressure, wherein the plurality of battery cells are positioned between the two end-plates; and securing a strapping material around the cell-stack, wherein the strapping material forces the two end-plates together to maintain the predetermined pressure on the cell-stack.

In certain aspects, the composite battery enclosure applies the predetermined pressure transversely from a first end to a second end of the cell-stack.

In certain aspects, each of the first end and the second end comprises a rigid end-plate.

In certain aspects, the plurality of primary fibers is oriented parallel with a load path imparted on the cell-stack by the composite battery enclosure.

In certain aspects, the cell-stack further comprises a plurality of distributed cell spacers.

In certain aspects, the plurality of distributed cell spacers is interleaved with the plurality of battery cells, wherein each of the plurality of cell spacers is fabricated from a compliant material.

In certain aspects, each of the plurality of distributed cell spacers is fabricated from a compliant material.

In certain aspects, each of the plurality of distributed cell spacers comprises silicone foam rubber, polyolefin foam, or polyurethane foam.

In certain aspects, the composite battery enclosure is a strapping material with two end plates positioned at each end of the cell-stack, the strapping material wrapping around the two end plates.

In certain aspects, each of the plurality of battery cells is a lithium polymer pouch.

In certain aspects, the plurality of battery cells are electrically coupled to one another to yield, in aggregate, a first nominal voltage.

In certain aspects, the plurality of battery cells are electrically coupled to one another using a printed circuit board (PCB).

In certain aspects, the battery pack is electrically coupled with a second battery pack to define a battery pack assembly having a second nominal voltage that is greater than the first nominal voltage.

In certain aspects, the battery pack assembly comprises a battery pack controller configured to monitor each of the battery pack and the second battery pack.

In certain aspects, the battery pack assembly is electrically coupled with a solar panel, wherein the solar panel is configured to charge the battery pack assembly.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like reference numbers refer to like structures. The figures are not necessarily to scale, emphasis instead being placed upon illustrating the principles of the devices, systems, and methods described herein.

FIGS. 1a through 1d illustrate an example solar-powered aircraft.

FIGS. 3c and 3d illustrate an example battery array installed within an aircraft structure.

FIGS. 5a through 5c illustrate assembly views of an example 2p pouch cell assembly and an example battery pack composed of a plurality of 2p pouch cell assemblies.

DETAILED DESCRIPTION

Figure 1C:
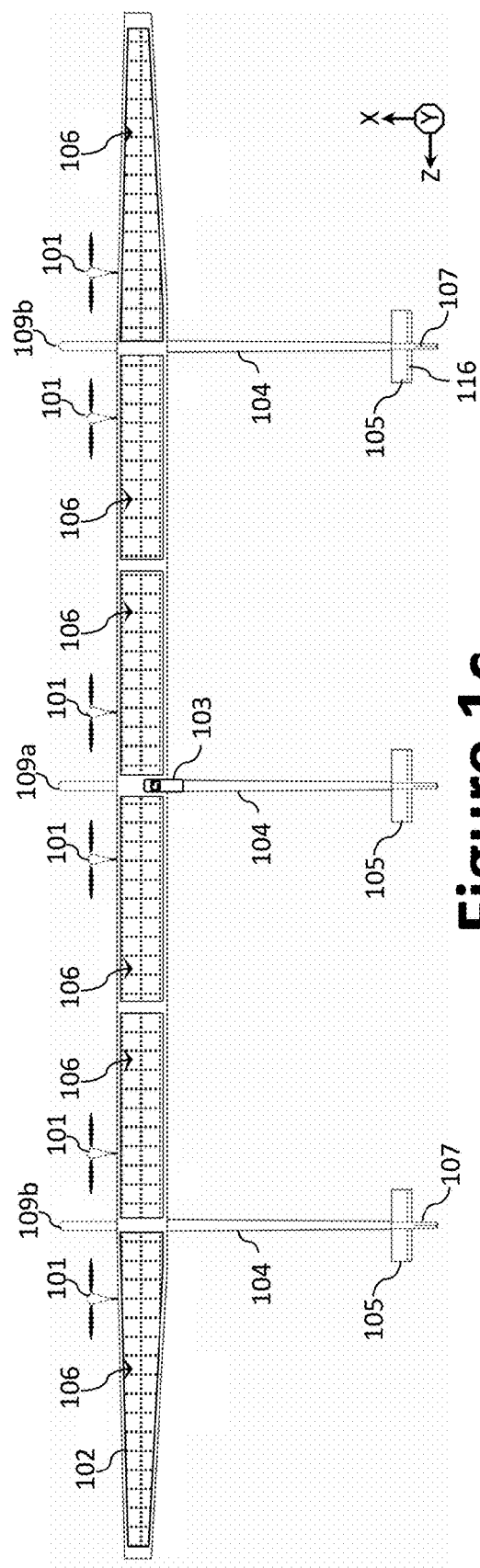

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein.

The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "side," "front," "back," and the like are words of convenience and are not to be construed as limiting terms. As utilized herein the terms "circuits" and "circuitry" refer to physical electronic components (i.e., hardware) and any software and/or firmware ("code"), which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code.

The terms "aerial vehicle" and "aircraft" refer to a machine capable of flight, including, but not limited to, fixed-wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters, multirotor, etc.), tilt-rotor/tilt-wing aircraft, multi-rotor aircraft, etc.

The term "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y, and/or z" means "one or more of x, y, and z."

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

The term "composite laminates" as used herein, refers to a type of composite material assembled from layers (i.e., a "ply") of additive material and a matrix material.

The term "composite structure" as used herein, refers to structures or components fabricated, at least in part, using a composite material, including, without limitation, composite laminates.

The term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "solar panel" refers to an array of one or more photovoltaic cells configured to collect solar energy to generate electrical power. The solar panels may employ one or more of the following solar cell types: monocrystalline silicon solar cells, polycrystalline silicon solar cells, string ribbon solar cells, thin-film solar cells (TFSC), cadmium telluride (CdTe) solar cells, copper indium gallium selenide (CIS/CIGS) solar cells, and the like. To reduce overall weight and to improve reliability and durability, it is advantageous to employ light weight and/or flexible solar panels (e.g., thin-film solar panels).

Figure 1D:
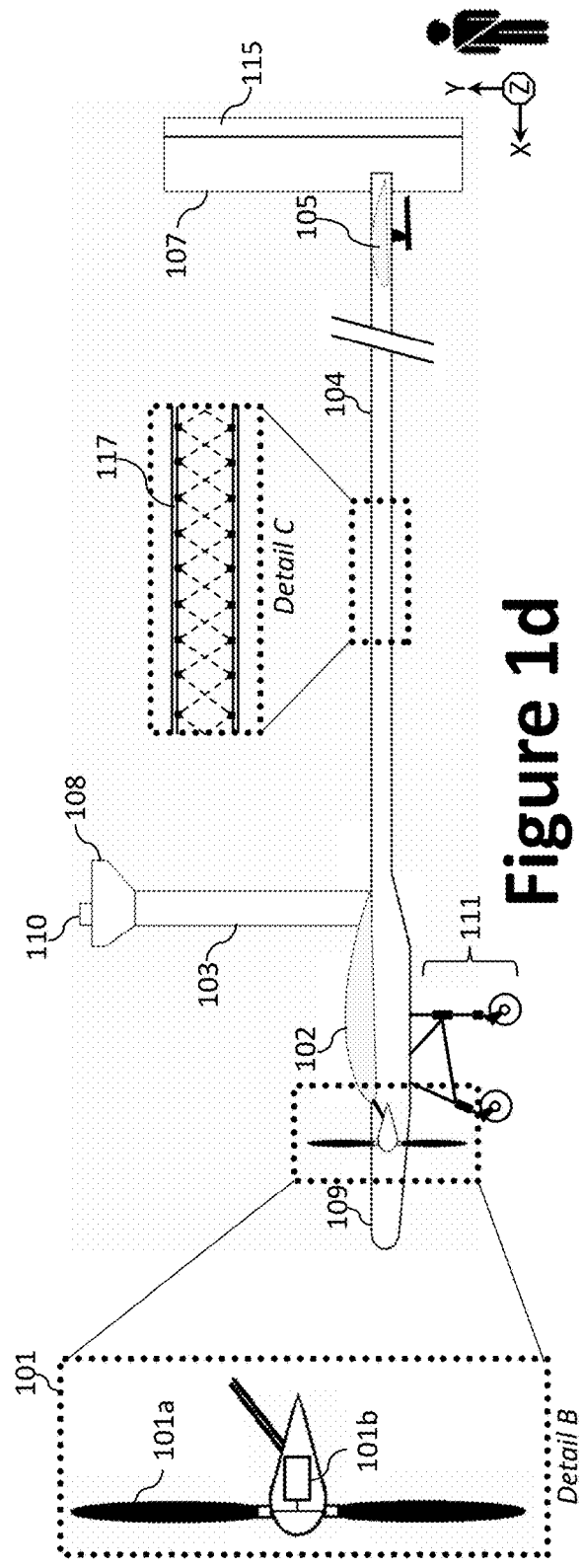

FIGS. 1a through 1d illustrate an example solar-powered aircraft 100. Specifically, FIG. 1a illustrates an isometric view of the solar-powered aircraft 100, while FIGS. 1b through 1d illustrate, respectively, front, top, and side views of the solar-powered aircraft 100. The various structural components of the aircraft 100 may be fabricated from metal, a composite material, or a combination thereof. For example, the wing 102 may be fabricated using fused deposition modeling (FDM), stereolithography (SLA), selective laser sintering (SLS), and/or any other suitable type of additive manufacturing/3D printing. A benefit of this fabrication method is that it produces a high-performing, more stable aircraft, using advanced sensing and 3D printing disciplines. FDM is a thermal polymer layer deposition process that produces components one layer at a time, effectively printing aircraft components rapidly, in low-volume, and to exacting material specifications. Using FDM, numerous wing design iterations may be inexpensively manufactured to meet desired strength and stiffness requirements, control surface sizing, and other characteristics. Further, additional wing panels/components may be fabricated to allow for tailored sensor integration, ease of generating additional actuation schemes or altering the control surface placement, ease of characterizing the strain on the wing, and an ability to easily alter the wing's stiffness to provide the best platform for proprioceptive sensing in a given application. This capability also offers robustness against wing damage, as replacement components are readily reproducible.

The solar-powered aircraft 100 generally comprises a wing 102, one or more propulsors 101 (e.g., a propeller 101a and associated gearing, which is axially driven by one or more electric motors 101b), a plurality of fuselages 109 (e.g., a center fuselage 109a and a set of outboard fuselages 109b), a plurality of tail booms 104 (e.g., a center tail boom 104b and a set of outboard tail booms 104a, 104c; each illustrated as an elongated boom coupled to the aft end of a fuselage 109), a plurality of tail sections 112, a payload mast 103, and landing gear 111. As illustrated, the wing 102 comprises a first wing tip 114a (port side), a second wing tip 114b (starboard side), and a midpoint 114c along the wing's 102 wingspan that is approximately half way between the first wing tip 114a and the second wing tip 114b.

Each propulsor 101 generally comprises a motor 101b coupled to, and configured to drive/rotate, a propeller 101a. Detail B of FIG. 1d best illustrates the propeller 101a and motor 101b, where the nacelle has been partially removed. The motor 101b may be an electric motor controlled via an electronic speed controller (ESC). To that end, an ESC may also be provided to control the motor 101b, which may be coupled (or otherwise integrated) with the wing 102 (e.g., as part of a nacelle pod). The propulsor 101 may be positioned on the wing 102, the tail boom 104 (e.g., at the proximal end), or a combination thereof. For example, each of the propulsors 101 may be positioned on, or within, the wing 102 (e.g., wing-mounted, as illustrated) in either a pusher configuration or a tractor configuration (as illustrated). Further, while each fuselage 109 is illustrated as having two propulsors 101 associated therewith, additional or fewer propulsors 101 may be provided. Regardless of the propulsion configuration, each of said plurality of propulsors 101 may be oriented to direct thrust toward the distal end of the tail boom 104 (aft).

The wing 102 and/or the horizontal stabilizer 105 may comprise an array of solar panels 106 to generate power. As illustrated in FIG. 1a, the solar panels 106 may be positioned along the upper surface of the center wing panel 102b and a portion of each of outboard panels 102a, 102c. Alternatively, the solar panels 106 may be positioned along the entire length of the 102 as illustrated in FIG. 1c. The solar-powered aircraft 100 may further comprise one or more energy storage devices operatively coupled to the solar panels 106 to power the vehicle management system 218 and various electric loads. The one or more energy storage devices store collected solar energy for later use by the solar-powered aircraft 100 (e.g., when sunlight is unavailable, typically at nighttime). As used herein "energy storage device" refers to a battery or similar instrumentality known to those of skill in the art capable of storing and transmitting energy collected from the solar panels 106, including but not limited to a rechargeable battery (e.g., lithium-polymer batteries), a regenerative fuel cell, or combinations thereof.

While the wing 102 is illustrated as generally linear with tapered outboard portions, other configurations are contemplated, such as back-swept, tapered, rectangular, elliptical, forward-swept, and the like. Therefore, the wing 102 may be any type of fixed wing, including, but not limited to, a straight wing, a swept wing, a forward swept wing, a dihedral wing (an upward angle from horizontal), an anhedral wing (a negative dihedral angle—downward angle from horizontal), or any other suitable type of fixed wing as known by those of ordinary skill in the art. The length of the wingspan may be, for example, 40 to 160 meters, more preferably, 60 to 120 meters, most preferably about 80 meters. While the leading and trailing edges of the wing 102 are illustrated as tapered along the outboard portion of its wingspan length, the wing 102 may be entirely straight/linear. As illustrated, the wingspan of the wing 102 may be substantially perpendicular relative to the longitudinal length of the fuselages 109 and tail booms 104; however, the wing 102 may instead be swept back or swept forward. In certain aspects, the wing 102 may be modular and configured for disassembly; thereby allowing the solar-powered aircraft 100 to be more easily transported by land and/or to physically fit within a hanger or other structure for storage. For example, the wing 102 may be fabricated from a plurality of wing panel modules (e.g., a center wing panel 102b, and a set of outboard panels 102a, 102c) and removably joined to one another ended to end via a set of field joints 113. Each of the field joints 113 may employ one or more fasteners (e.g., bolts, clips, etc.) to facilitate coupling therebetween.

As can be appreciated, control surfaces on the wing typically require additional structural reinforcements and actuators, which result in additional weight. In addition, adding control surfaces to a wing increases the drag during flight. Further, control surfaces on a wing can also require that the skin panel be broken into sections, as opposed to having a substantially unbroken construction that allows for the solar panels 106 to cover more of the upper surface of the wing 102. Finally, manufacturing control surfaces adds complexity as attachment mechanisms, hinges, more parts, and/or multiple skin panels must be made. Removing the control surfaces, however, eliminate these complexities. Therefore, unlike traditional aircraft, the wing 102 need not include movable control surfaces (e.g., flaps, slats, etc.) along the trailing or leading edges of its wingspan. Indeed, to reduce weight and complexity, the wing 102 may be generally devoid of movable control surfaces. For example, the upper and lower surface of the wing 102 may be fabricated as a single piece structure without any moving parts. Control of the wing 102 may instead be achieved through control surfaces positioned on one or more of the tail sections 112 positioned at the distal end of each tail boom 104. Example control methods are described in described in greater detail by commonly owned U.S. patent application Ser. No. 15/702,441 to Daniel Uhlig et al., which was filed on Sep. 12, 2017 and is titled "Wing-Twist Controlled Aircraft."

The payload mast 103 may be coupled at its proximal end to a fuselage 109 (e.g., the center fuselage 109a, as illustrated) and oriented generally perpendicularly to the longitudinal length of the center fuselage 109a and the lateral length of the wing 102. The payload mast 103 may be, for example 2 to 6 meters, or about 4 to 5 meters in height (e.g., above the fuselage 109). The distal end of the payload mast 103 may comprise a crow's nest structure 108 to house or otherwise support a payload 110. As illustrated, the leading edge/surface of the payload mast 103 and the crow's nest structure 108 may be aerodynamically shaped to reduce drag and turbulence during flight. Detail A of FIG. 1a best illustrates the crow's nest structure 108. Note that multiple sensor payload devices (e.g., at least two, or, as illustrated, three) may be positioned on the crow's nest structure 108 and oriented in different directions via a gimbal system.

Positioning the payload 110 at the distal (upper) end of the payload mast 103 helps to provide a large, unobstructed field of view, which is particularly useful where a direct line-of-sight is important (e.g., in optical systems). While a payload 110 is illustrated atop the payload mast 103, additional payloads may be provided elsewhere in the solar-powered aircraft 100, including the fuselages 109, the wing 102, tail booms 104, etc. For example, the one or more payloads 110 may be configured as a payload pod that is rotatably and pivotally coupled to the solar-powered aircraft 100 via a gimbal system, such as an underside surface to enable the payload pod to be oriented downward to monitor objects on the ground.

As used herein, "payload" refers to one or more sensors, communications packages, weapons systems, instruments, antennas, cameras, radars, navigation systems, flight control systems, or other cargo. For example, navigation and flight control systems may be communicatively coupled with an inertial navigation system ("INS") that is communicatively coupled with an inertial measurement unit and global positioning system ("GPS") receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The payload 110 may also serve as a communication relay between a remote device (e.g., a satellite/base station) and a device on the ground.

The plurality of tail booms 104 may include a center tail boom 104b and a set of outboard tail booms 104a, each of which includes a proximal end and a distal end. As illustrated, the proximal end of a first outboard tail boom 104a may be secured to a first outboard fuselage 109b (or the wing 102) and positioned at a point that is between the midpoint 114c and the first wing tip 114a, the proximal end of the second tail boom 104 may be secured to a second outboard fuselage 109b and positioned at a point that is between the midpoint 114c and the second wing tip 114b, and the third tail boom 104 may be secured to the center fuselage 109a at (or near) the midpoint 114c. Each tail boom 104 comprises a proximal end and a distal end, where each of the tail booms 104 may be secured at its proximal end to fuselage 109, while being coupled to a tail section 112 at its distal end. As best illustrated in FIG. 1d, the solar-powered aircraft 100 (e.g., the tail booms 104, fuselages 109, etc.) may be fabricated using a tubular core structure 117, which is then covered with aircraft skin (e.g., composite materials, fabric, metal, metals alloys, etc.). Detail C of FIG. 1d best illustrates the tubular core structure 117, where the aircraft skin has been removed. In certain aspects, the tail boom 104 and the fuselage 109 may be fabricated as a single, unitary component. As illustrated, though not required, the plurality of tail booms 104 may be evenly distributed along the length of the wing's 102 wingspan. While the solar-powered aircraft 100 is illustrated as having three fuselages 109 and three tail booms 104, a person of skill in the art would understand that additional, or fewer, fuselages 109/tail booms 104 may be employed to achieve a desired function and as a function of, for example, the length of the wing 102.

To facilitate takeoff and landing, the solar-powered aircraft 100 may be provided with one or more sets of landing gear 111 (e.g., one per fuselage 109), which may be positioned on the undercarriage of the aerial vehicle. For example, a set of landing gear 111 may be provided at the underside of the fuselage 109 and/or tail boom 104. The landing gear 111 may employ, inter alia, a set of wheels (as illustrated) and/or skids. In operation, the landing gear 111 serves to support the solar-powered aircraft 100 when it is not flying; thereby allowing it to take off, land, and taxi without causing damage to the airframe. Where desired and at the expense of added weight, the wheels may include brakes and/or be powered by a motor, such as an electric motor. Further, the wheels may be equipped with shock absorbers, or more advanced air/oil oleo struts, to permit runway and rough terrain landing. To decrease drag in flight, the landing gear 111 may be retracted into a landing gear bay 304 (also called a wheel well) defined by, for example, the fuselage 109, the wing 102, tail boom 104, or another component of the airframe. The landing gear bay 304 may be concealed behind one or more bay doors 306 (or panels), thereby further decreasing drag in flight. In operation, the bay doors 306 are selectively opened to allow for the landing gear 111 to egress.

As illustrated, each tail section 112 may comprise one or more one control surfaces to steer the tail section 112 in a desired direction. For example, each tail section 112 may comprise a vertical stabilizer 107 (e.g., a dorsal fin) extending vertically from the tail boom 104, a rudder 115 operatively coupled to the vertical stabilizer 107, a horizontal stabilizer 105 extending laterally from either side of the tail boom 104, and an elevator 116 (or portion thereof) operatively coupled to each side of the horizontal stabilizer 105.

In certain aspects, the tail section 112 may employ one or more all-moving components (e.g., a stabilator). The elevators 116 may be configured to change the pitch of the tail section 112, while the rudder 115 may be configured to change the yaw of the tail section 112. The solar-powered aircraft's 100 tail sections 112 be selectively controlled (e.g., via a flight controller/vehicle management system 218) to control the overall pitch, roll, and yaw of the solar-powered aircraft 100, thereby obviating the need for movable control surface on the wing 102. The pitch and/or yaw of the tail sections 112 may be separately controlled via the rudders 115 and/or elevators 116 to create a local force moment at the location the tail boom 104 attaches to the wing 102.

Each rudder 115 may be rotatably and/or hingedly coupled to a vertical stabilizer 107 via one or more hinges to enable the rudder 115 to move about an axis defined by the vertical stabilizer 107 at its trailing edge. Similarly, the elevators 116 may be rotatably and/or hingedly coupled to the horizontal stabilizer 105 via one or more hinges to enable movement about an axis defined by the horizontal stabilizer 105 at its trailing edge. In certain aspects, one or more of the rudders 115 and/or the elevators 116 may additionally be configured with a mechanism (e.g., rails, tracks, etc.) to allow for other, non-rotatable movement, such as, for example, sliding and/or lateral movement relative to the vertical or horizontal stabilizer. In alternative embodiments, one or more of the rudders 115 and/or the elevators 116 may be omitted entirely from a given tail section 112. Depending on the desired tail configuration, the horizontal stabilizer 105 and vertical stabilizers 107 may be operatively coupled to one another as well as the tail booms 104, or operatively coupled only to the tail booms 104. The tail section 112 may be configured in one of multiple tail configurations, including, for example, fuselage mounted, a cruciform, T-tail, a flying tailplane, a pi-tail (i.e., π-tail), a V configuration, an inverted V configuration (i.e., "Λ" configuration), a twin tail (H-tail arrangement or U-tail arrangement), etc. Further, the horizontal stabilizer 105 may be straight, back-swept, tapered, rectangular, elliptical, forward-swept, etc. In certain aspects, the tail section 112 may employ a combination H- and Λ-tail arrangement where the tail section 112 comprises Λ-tail surfaces that couple to the horizontal stabilizer 105 to provide a combination H- and Λ-tail arrangement. An example combination H- and Λ-tail arrangement is described in greater detail by U.S. patent application Ser. No. 15/494,780 to Robert W. Parks et al., which was filed on Apr. 24, 2017 and titled "Vertical Take-Off and Landing Aircraft."

Persons of ordinary skill in the art will recognize that alternative and/or additional structural arrangements may be implemented to accommodate the design and/or operational requirements of the tail section 112. For example, the tail section 112 may instead employ only one or more vertical stabilizer 107, one or more horizontal stabilizer 105, and/or slanted or offset stabilizers that have both horizontal and vertical dimensions. Additionally, or alternatively, the tail section 112 may include multiple rudders 115 on the vertical stabilizer 107 and/or a plurality of elevators 116 on each side of the horizontal stabilizer 105.

Figure 2:
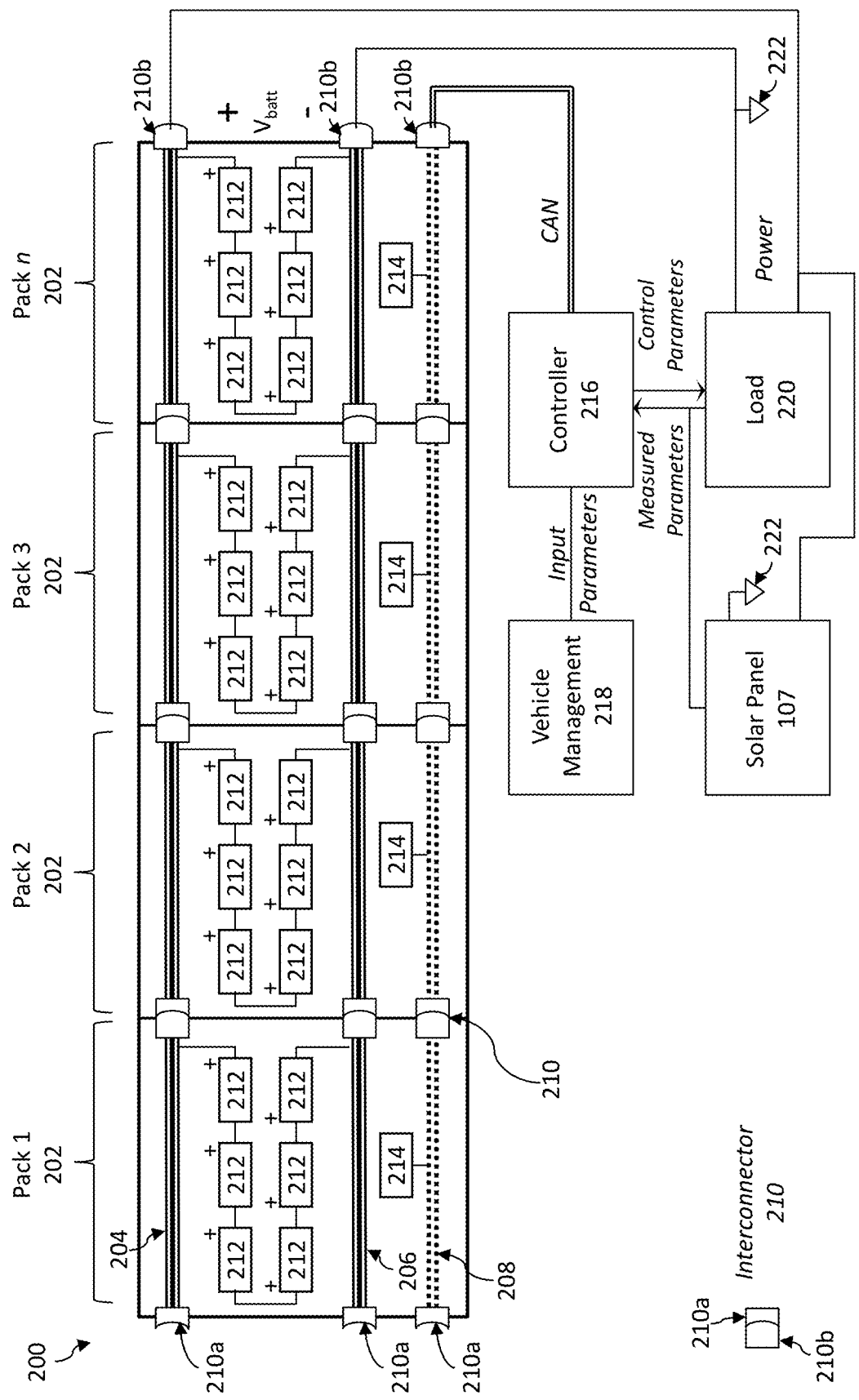
FIG. 2 illustrates an example solar power system having a battery array.

As illustrated in FIG. 2, the solar-powered aircraft 100 may be equipped with one or more battery arrays 200 to supply power to the various electric loads 220. The solar-powered aircraft 100 may employ a vehicle management system 218 operable to control the various functions of the solar-powered aircraft 100 and/or one or more payloads 110. The electric load 220 may include, for example, the payload 110, one or more motors (e.g., the motors 101b used in connection with the propulsors 101), actuators (e.g., to control the flight control surfaces, landing gear 111, bay doors, and the like), etc. Each battery array 200 generally comprises a plurality of battery pack assemblies 202 (e.g., Pack 1, Pack 2, Pack 3, Pack n, as illustrated) electrically coupled to each other; thereby defining a power supply line 204, a ground line 206, and, where desirable, a data communication line 208. The ground line 206 may be electrically coupled to an equipotential point 222 (e.g., ground). The data communication line 208 may be shielded so as to mitigate electromagnetic interference (EMI) for, inter alia, the power supply line 204. The data communication line 208 may be coupled to one or more sensors 214 or devices that monitor or control, for example, the health and/or operating parameters (e.g., temperature, humidity, voltage, etc.) of each battery pack assembly 202 or battery pack 212.

The battery pack assemblies 202 within a battery array 200 may be electrically connected to one another via one or more interconnectors 210 to facilitate the passing of power and/or data signals from one battery pack assembly 202 to another battery pack assembly 202. The interconnectors 210 may employ, for example, a first connector 210a (e.g., a female connector) and a second connector 210b (e.g., a male connector) configured to mate with one another. For example, when arranged in a row/string, power and/or data signals may be conveyed from one end (e.g., proximal end) of a battery array 200 to an opposite end (e.g., distal end) of the battery array 200 via the interconnectors 210; each of which can provide pass through functionality in the event of an isolated battery pack assembly 202 failure. For instance, the battery pack assemblies 202 can integrate the power rails (e.g., power supply line 204, ground line 206) and data communication lines 208 with in-line connections such that battery pack assemblies 202 can be attached to one another to form continuous power and data pathways for feeding the load and interacting with the system controller 216.

In certain aspects, the battery array 200 can be expanded and contracted as needed (e.g., additional battery pack assemblies 202 may be connected or disconnected). In other words, power and/or data signals are carried across the battery array 200, thereby only requiring an electrical connection at one end of the battery array 200. Consequently, an energy storage system having such battery arrays 200 provides for quick electrical and mechanical integration. Further, the battery pack assemblies 202 may be fabricated in bulk, thereby obviating the need for costly, complicated, and potentially unreliable harness. In operation, the system controller 216, which may be processor controlled, monitors each of the one or more battery arrays 200 (and separately, each battery pack assembly 202), the one or more solar panels 106, and the one or more electric loads 220. For instance, in response to an input parameter (e.g., an instruction from the solar-powered aircraft's 100 vehicle management system 218), the system controller 216 may adjust the electric load 220 and/or adjust (or reallocate) power from the one or more battery arrays 200 to meet the electric load's 220 needs. To that end, the system controller 216 may be operatively coupled with a plurality of battery pack controllers 406, which are described below in connection with FIG. 4. The system controller 216 may communicate through either a simplex or redundant communications bus to each of the battery pack assemblies 202 in an energy storage system (e.g., battery array 200). The system controller 216 may employ one or more control area network (CAN) buses. In certain aspects, the battery array 200 may employ a power allocation switching unit system and/or algorithm for managing battery groups and solar panels. An example power allocation switching unit system is described in greater detail by commonly owned U.S. Patent Publication No. 2017/0331323 to Adam Scott Ehrmantraut et al., filed on May 12, 2017 and titled "Solar Power System and Method Thereof."

Figure 3A:
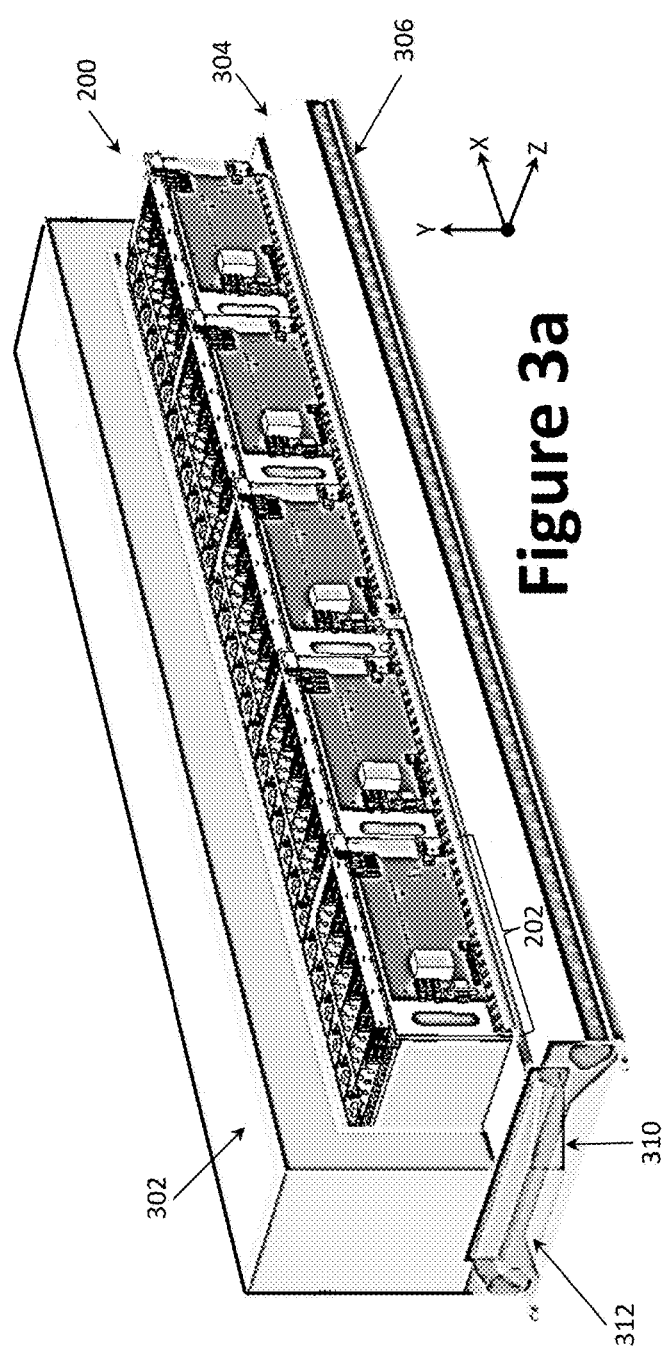
FIGS. 3a and 3b illustrate an example battery array.
Figure 3B:
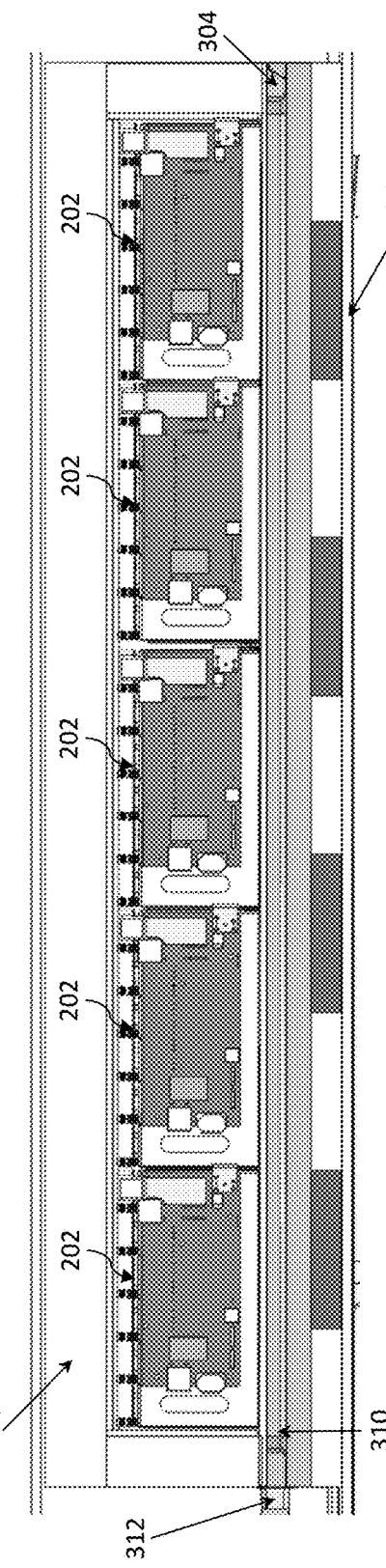

FIGS. 3a and 3b illustrate an example battery array 200, while FIGS. 3c and 3d illustrate the example battery array 200 installed within an aircraft structure (e.g., a fuselage 109, or other aircraft structure). Specifically, FIG. 3a illustrates an isometric view of the battery array 200, while FIG. 3b illustrates a side plan view thereof. As illustrated, a plurality of battery pack assemblies 202 (e.g., 2 to 20 assemblies, or 5 assemblies, as illustrated) may be electrically coupled to one another (e.g., in a string) and secured within a battery array housing defined by the housing cover 302 and the housing tray 306. To regulate the temperature of the battery pack assemblies 202, a fluid (e.g., air) may be conveyed into the battery array housing and across the battery pack assemblies 202 via the front cooling door 310, whereby the air exits the battery array housing via the rear cooling door 304. The front cooling door 310 may employ a front duct adapter 312 to allow for air to pass from an inlet (e.g., the leading edge of a fuselage 109) to the front cooling door 310. To provide an insulating function, each of the front cooling door 310 and rear cooling door 304 may be closed; thereby sealing the battery array housing.

FIGS. 3c and 3d illustrate cut away views of a fuselage 109 having a battery array 200 installed therein. As illustrated, the battery array 200 may be positioned just above the landing gear bay 308 that houses the landing gear 111 when retracted. As illustrated, the landing gear bay 308 comprises a set of bay doors 332 to conceal the landing gear 111 during flight, thereby reducing drag. The battery array 200 is preferably sufficiently flexible to account for flexing of the solar-powered aircraft 100 or components thereof (e.g., the fuselage 109). To that end, the battery pack assemblies 202 may be spaced to provide a gap between adjacent battery pack assemblies 202. As illustrated, the leading edge of the fuselage 109 may define an air inlet 314 to receive and guide fluid (e.g., a cooling air path) to the battery array housing via an air duct 316, the front duct adapter 312, and front cooling door 310. A second cooling path may be used to cool on-board electronics 318 (e.g., an Array Consolidation and Switching Unit (ACSU)) via a second air inlet 320 and air outlet 322. As illustrated, the second air inlet 320 may be positioned near the leading edge, just below the air inlet 314. Insulation 328 (e.g., foam, such as PHMUL, Rohacell 31, etc.) may be provided on each side of the housing cover 302 and below the housing tray 306 to assist in temperature regulation.

Each of the battery pack assemblies 202 may include a resistive heater 326 (e.g., a mat) and a thermal actuator 324 (e.g., a wax actuator). In the event the temperature of one or more battery pack assemblies 202 drops below a predetermined temperature, the one or more battery pack assemblies 202 may be selectively heated using a resistive heater 326. Therefore, each of the resistive heaters 326 may be independently controlled. The thermal actuator 324 may be, for example, a linear actuator that converts thermal energy into mechanical energy by exploiting the phase-change behavior of waxes. The thermal actuator 324 may be used to open the cooling door. For example, one or more thermal actuators 324 may be used. Alternatively, a single solenoid (e.g., an electric actuator) may be used to open the cooling path. To assist with cooling, a tapered insulation barrier 330 layer may be positioned within the fuselage 109 beneath each of the battery pack assemblies 202 to mitigate temperature gradient.

Figure 4:
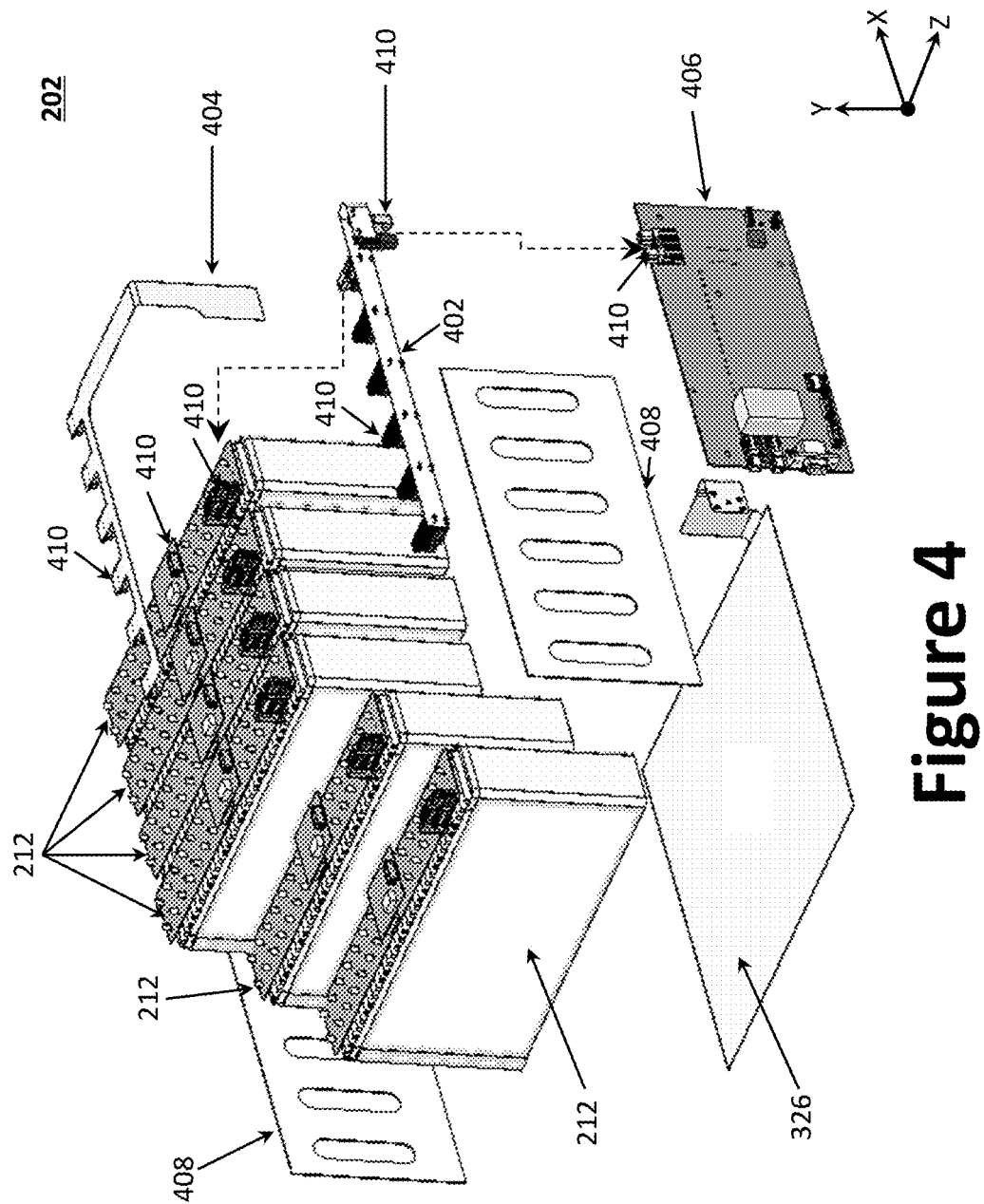
FIG. 4 illustrates an assembly view of an example battery pack assembly.

FIG. 4 illustrates an assembly view of an example battery pack assembly 202. As illustrated, the battery pack assembly 202 may comprise a plurality of battery packs 212, an internal power harness 402, an internal data harness 404, a battery pack controller 406, and a set of shear walls 408. The internal power harness 402 serves to interconnect the output terminals of the battery packs 212 (e.g., via the power interface connectors 510), while the internal data harness 404 serves to interconnect the various sensors coupled to battery packs 212 (e.g., via the data interface connectors 508). The battery packs 212 may be electrically arranged and connected in a series configuration, in a parallel configuration, or a combination thereof to achieve a desired nominal voltage and/or power. The battery pack controller 406, which is operably coupled to each of the internal power harness 402 and internal data harness 404, monitors and adjusts parameters of the battery pack assembly 202 during operation. The battery pack controller 406 may be operatively coupled with the system controller 216 to receive commands/instructions from the system controller 216 and to provide feedback thereto (e.g., measured parameters, operating status, etc.). As illustrated, the battery pack controller 406 may couple to each of the internal power harness 402, the internal data harness 404, and the resistive heater 326 using one or more plugs/connectors 410. The set of shear walls 408 increases the structural integrity of the battery pack assembly 202 by mitigating/reducing shifting or flexing of the battery packs 212. The set of shear walls 408 is preferably fabricated from a material that is non-conductive, light weight, and rigid (or semi-rigid). In one example, the set of shear walls 408 may be fabricated using a composite material. While the example battery pack assembly 202 is illustrated as having six battery packs 212, one of skill would appreciate that additional or fewer battery packs 212 may be employed depending on the power needs and/or desired nominal voltage.

FIGS. 5a through 5c illustrate an example battery pack 212 at various stages of assembly. Specifically, FIG. 5a illustrates an example 2p pouch cell assembly 518 used in the battery pack 212, while FIG. 5b illustrates an assembly view of the battery pack 212 and FIG. 5c illustrates a fully assembled battery pack 212. With reference to FIG. 5a, isometric, side, and front views of an example 2p pouch cell assembly 518 are provided. As illustrated, the 2p pouch cell assembly 518 generally comprises a set of battery cells 502 interleaved with a set of cell spacers 504. While the thickness can vary, the height and width of the battery cells 502 and cell spacers 504 may be substantially the same; though the cell spacers 504 may be slightly smaller, as illustrated. The one or more battery cells 502 may be, for example, lithium-polymer pouch cells; however other battery cell types/chemistries are contemplated, such as lithium-ion, nickel-cadmium (NiCd), nickel-metal hydride (NiMH), etc.

Each of the cell spacers 504 may have a thickness of 0.5 to 1.0 mm, or about 0.8 mm. The modulus of the cell spacers 504 (i.e., force vs displacement) is at least partially responsible for applying the internal pressure load of the battery enclosure 516 onto the battery cells 502 (e.g., the cell-stack). The cell spacers 504 may employ a density ranging from 0.8 to 20 pounds per cubic foot (PCF), more preferably about 1.5 to 6.0 PCF. In certain aspects, the cell spacers 504 may comprise a fire retardant. The cell spacers 504 may be fabricated from, for example, a compliant material, such as silicone foam rubber, a fine-celled, irradiation cross-linked, polyolefin foam (e.g., Volara™ EO foam), polyurethane foam (e.g., Poron® Microcellular Urethanes foams), or another flexible/conforming material. For various optimization reasons, cell spacers 504 may be distributed between the battery cells 502; however, the cell spacers 504 may be otherwise arranged based on application requirements. In one aspect, the cell spacers 504 may be interleaved such that the cell-stack alternates between battery cells 502 and cell spacers 504. Each battery cell 502 may include a set of electrical tabs 506 (such as solder tabs, or other similar terminals) to electrically couple with one another or another device (e.g., a printed circuit board (PCB) 520).

With reference to FIG. 5b, sixteen (16) 2p pouch cell assemblies 518 may be stacked to define a cell-stack and secured to a PCB 520. Specifically, 32 battery cells 502 may be interleaved with 32 cell spacers 504. The electrical tabs 506 may pass through the PCB 520 and may be soldered directly to the PCB 520 (e.g., a rigid PCB). Depending on the nominal voltage of each battery cell 502, the battery cells 502 may be electrically arranged and connected in a series configuration, in a parallel configuration, or a combination thereof to achieve a desired nominal voltage and/or power for the battery pack 212.

One or more end-plates 512 (e.g., a shim or other stiffening section) may be provided at one or both ends of the cell-stack. The cell-stack and end-plate(s) 512 may then be inserted into a battery enclosure 516. The battery enclosure 516 may be, for example, a rigid Kevlar pressure enclosure configured to maintain a predetermined pressure on the cell-stack (and end-plate(s) 512). The battery enclosure 516 may be wrapped with a film 514, such as a pyrolytic graphite sheet (PGS) with polyester (PET) and pressure sensitive adhesive (PSA). As noted above, the battery pack assembly 202 employs plugs/connectors 410 to facilitate power/data interconnection. To that end, the PCB 520 further comprises data interface connectors 508 and power interface connectors 510 to allow for connection with, for example, the battery pack controller 406. The PCB 520 may further include circuitry to monitor and control the battery packs 212 within a battery pack assembly 202 via one or more sensors. The one or more sensors may include voltage sensors, amperage meters/sensors, temperature sensors, accelerometers, etc. As illustrated in FIGS. 5b and 5c, the lithium battery cells 502 are packaged in a battery enclosure 516, which may be fabricated as a composite structure; through other materials are contemplated, including plastic polymers and metals/metal alloys. FIG. 5c illustrates a fully assembled battery pack 212.

As noted above, lithium battery cells 502, such as lithium-polymer pouch cells, experience a performance and cycle-life increase when a pressure is applied normal to the battery cell's 502 thickness. In the example of lithium-polymer batteries, the pouch battery cells 502 experience performance benefit when pressure is applied perpendicularly to the battery cell's 502 internal layers. Ideally, this pressure should remain constant as the battery cells 502 swell cyclically. One solution may be to rely on the distributed cell spacers 504, where the lithium battery cells 502 may be preloaded to a desired pressure and inserted into the battery enclosure 516. Example methods of pressure application include, without limitation, pre-compression of a cell-stack with an integrated compliant material or device, post-compression of cell-stack using mechanical methods, etc. Standard metallic or plastic structural methods to withstand the necessary applied load over time, however, can be excessively heavy for ultralight aircraft applications. Accordingly, it is desirable to achieve a required cell compression at a low cost and weight.

Figure 6A:
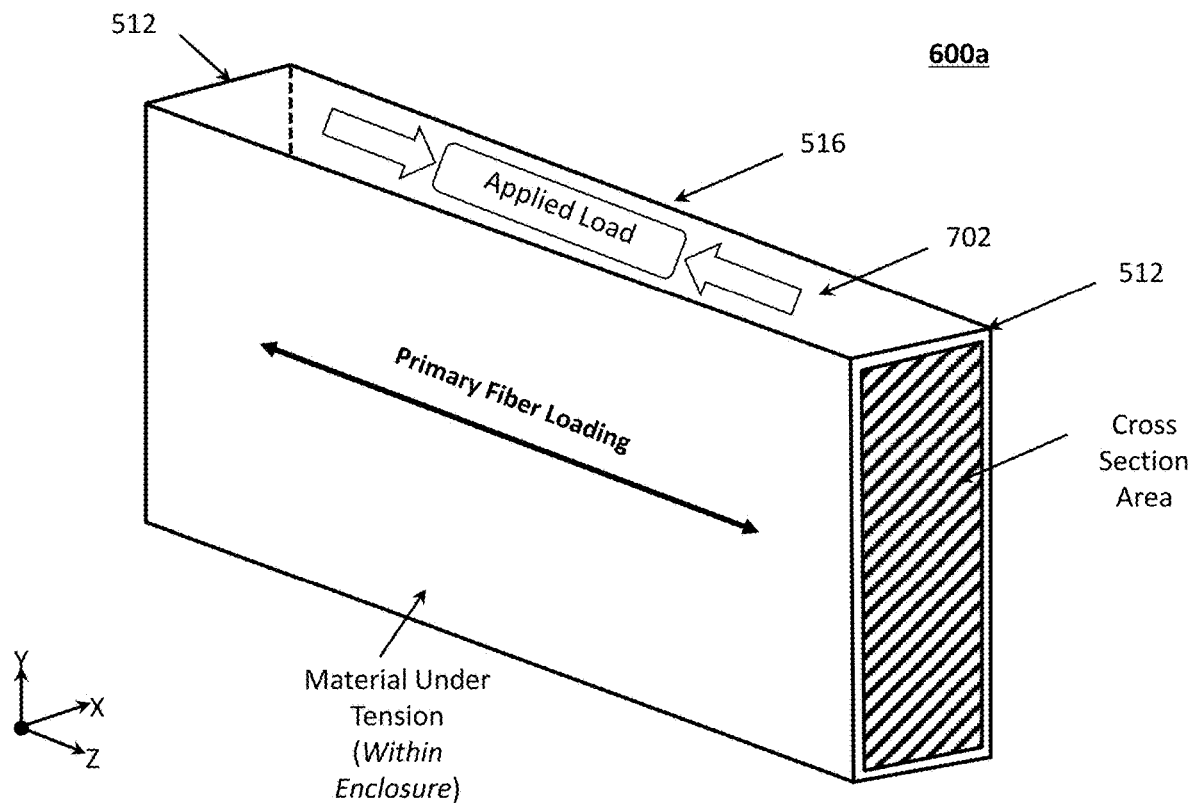
FIGS. 6a and 6b illustrate example enclosures fabricated using a composite material to define a composite-fiber compression sleeve.
Figure 6B:
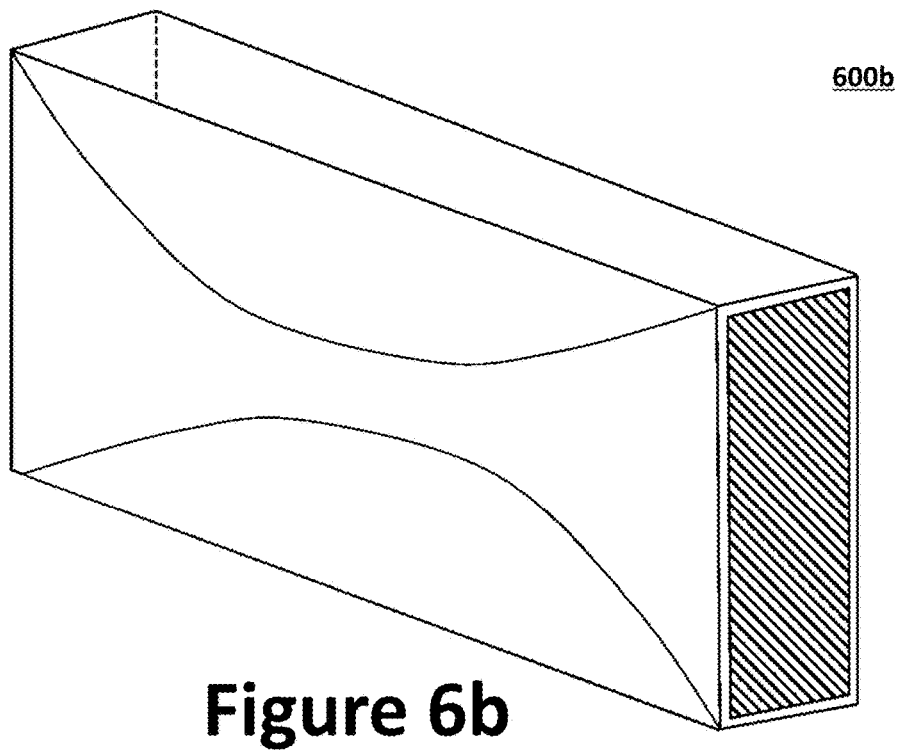

FIG. 6a illustrates an example battery enclosure 516 fabricated using a composite material, thereby defining a composite-fiber compression sleeve 600a. That is, the battery enclosure 516 may be fabricated as a composite structure (e.g., using a composite laminate or other composite material). In one aspect, the composite-fiber compression sleeve 600a may be constructed with its primary fiber orientation as desired for the load path, while the joining fibers may be in any desired orientation. Specifically, the composite-fiber enclosure's 600 primary fibers may be oriented parallel with the load path or at a non-limiting angle to the load path; depending on resulting modulus properties desired. Diagonal load paths may be desired to allow alternate sleeve geometries where desired, for example, to reduce stiffness or to satisfy some other requirement. The composite-fiber compression sleeve 600a may further employ one or more end-plates 512 (e.g., rigid plates at the ends of the cell-stack, shims, and the like). The end-plates 512 are advantageous in that they serve to transfer the tension force and to apply a load evenly over the cross-section area the cell-stack 702. Accordingly, the end-plates 512 should be sufficiently stiff to prevent deformation of the end-plates 512 and battery cells 502 from an expansion or a compression force (e.g., those from the battery cells 502, press/vice 700, the composite-fiber compression sleeve 600a, the strapping material 708, etc.). The end-plates 512 should be sufficiently wide and tall to provide desired protection to the battery cells during compression. For example, while the thickness may vary, the height and width of the battery cells 502 and end-plates 512 may be substantially the same. The end-plates 512 may be constructed of any stiff material or composite. To minimize weight for a given stiffness, the end-plates 512 may be constructed as a composite sandwich panel with a core material (e.g., a structural foam or plastic polymer) or other stiffening method. The composite-fiber compression sleeve 600a may have a continuous or varying cross section, an example of which is illustrated in FIG. 6b. Specifically, FIG. 6b illustrates a composite-fiber compression sleeve 600b where, instead of a rectangular piece of tension material, the tension material is hour-glass shaped. In certain aspects, the fiber can be bi-directional crisscross, which can offer a number of benefits; including weight savings, designed to fit a particular application, and fiber placement to control direction of flexibility and stiffness.

The cell-stack of the battery pack 212 may be compressed prior to insertion into the composite-fiber compression sleeve 600a. The method of compressing cells in the composite-fiber compression sleeve 600a may depend on whether the composite-fiber compression sleeve 600a has a fixed length or a variable length. An advantage of the composite-fiber compression sleeve 600a over other cell-stack compression technique is that it is passive and can rely solely on fiber tension of the cured composite/epoxy fabric to achieve its strength; thereby obviating the cost, complexity, and weight introduced by other solutions. That is, the composite-fiber compression sleeve 600a takes advantage of oriented fibers to allow for optimization of strength-to-weight ratio in the compression axis. Indeed, the use of composite-fiber material is advantageous because the direction of fiber lay-out can vary the direction of the compressive force. The composite-fiber compression sleeve 600a may be fixed-length, but its contents are compressible. For example, the contents can be specially compressed and inserted into the composite-fiber compression sleeve 600a.

The present state of the art suggests a continuous pressure within the range of 8 psi-20 psi over the life of lithium-polymer cells of the example chemical makeup.

Figure 7B:
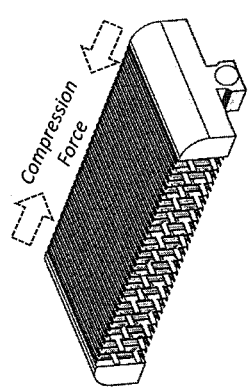
FIGS. 7a through 7c illustrate an example process for fabricating a battery pack using a composite-fiber compression sleeve.
Figure 7C:
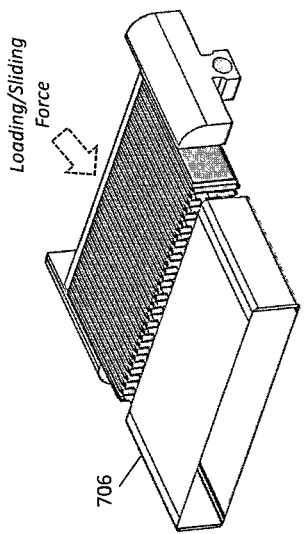
Figure 7A:
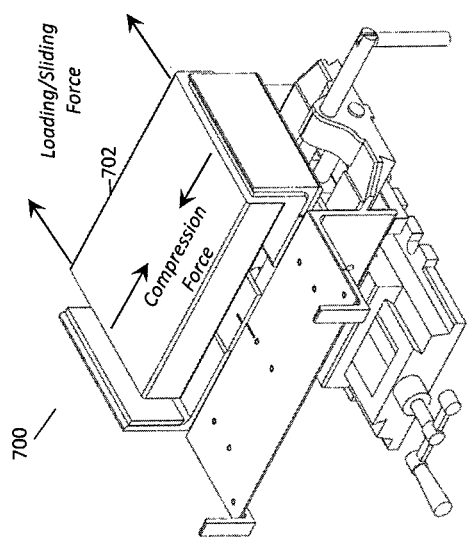

With reference to FIGS. 7a through 7c, where the composite-fiber compression sleeve 600a has a fixed enclosure length, a 2-axis press/vice 700 may be used to compress the cell-stack 702 (as best illustrated in FIG. 7b; indicated as using compression force arrows). The cell-stack 702 may then be then loaded into the composite-fiber compression sleeve 600a (while still compressed) as best illustrated in FIG. 7c. Once loaded in the composite-fiber compression sleeve 600a, the press/vice 700 can be released whereby the composite-fiber compression sleeve 600a then imparts the compression force on the cell-stack 702. Therefore, in one aspect, the battery pack 212 may be fabricated by a two-step method or process. First, a cell-stack 702 having a plurality of battery cells 502 may be compressed to a desired thickness/compression to achieve a predetermined pressure (e.g., using a vice 700). Once the predetermined pressure is achieved, the cell-stack 702 may be inserted into a battery enclosure (e.g., the composite-fiber compression sleeve 600a) while substantially maintaining the predetermined pressure on the cell-stack 702. To maintain an imparted pressure, the battery enclosure may be semi-rigid or fully rigid. As can be appreciated, the cell-stack 702 may be compressed beyond the targeted predetermined pressure to more easily load the cell-stack 702 into the composite-fiber compression sleeve 600a, where the cell-stack 702 may expand slightly to arrive at the predetermined pressure once released and loaded in the composite-fiber compression sleeve 600a. That is, the composite-fiber compression sleeve 600a is sized and shaped to secure the cell-stack at the targeted predetermined pressure.

Figure 8A:
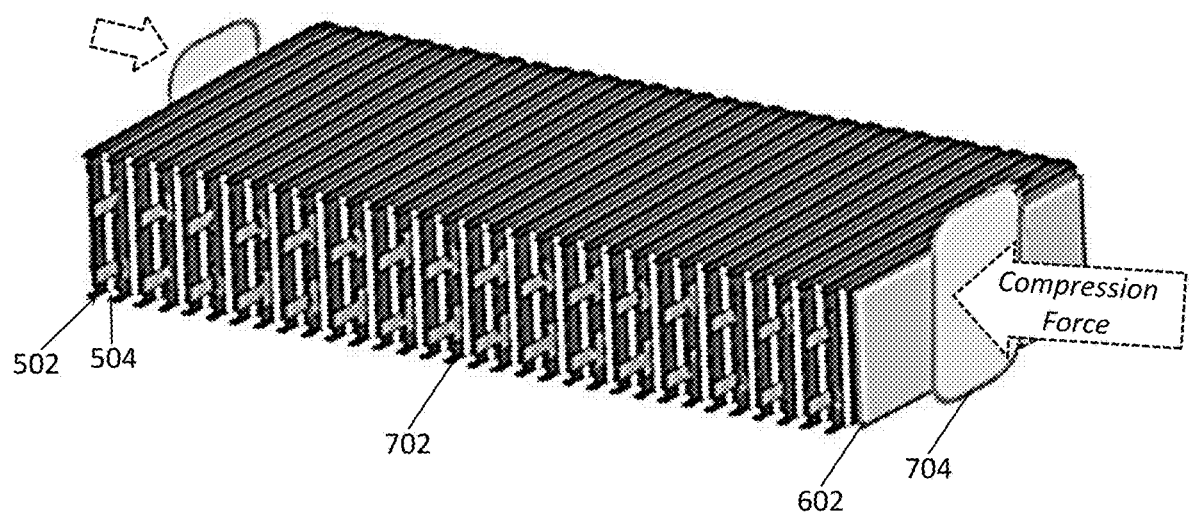
FIGS. 8a and 8b illustrate an example process for fabricating a battery pack using a strapping material to compress the cell-stack.
Figure 8B:
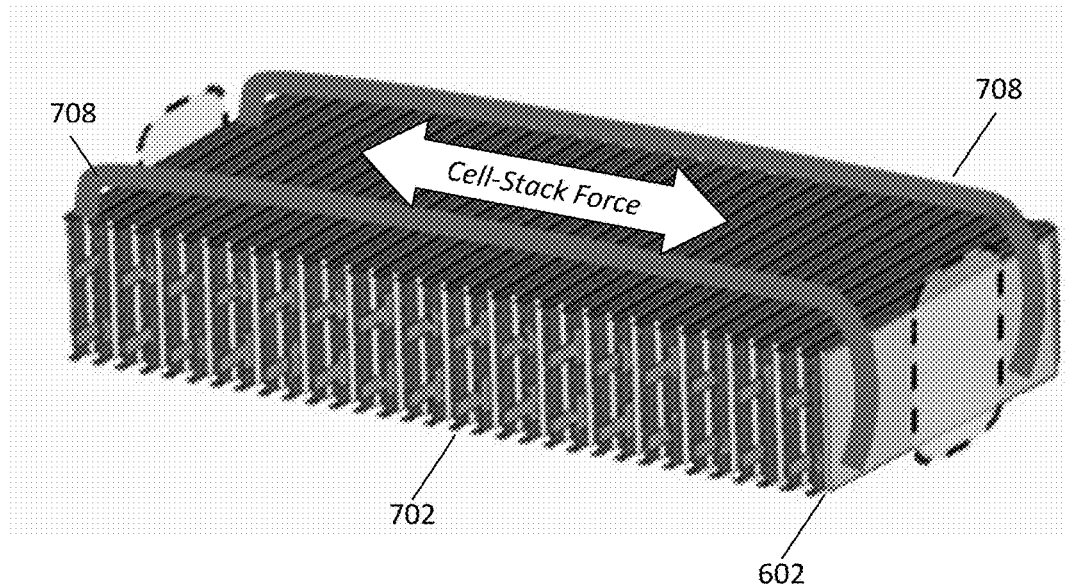

With reference to FIGS. 8a and 8b, where the composite-fiber compression sleeve 600a has a variable enclosure length, a press/vice 700 and a set of pressure plates 704 may be used to temporarily compress the cell-stack 702 as illustrated in FIG. 8a, including all loaded parts of the cell-stack 702 assembly (e.g., end-plates 512, battery cells 502, cell spacers 504, etc.). A variable enclosure length may be beneficial based on a desired design-specific assembly process. Once the cell-stack 702 is compressed to the desired thickness/compression to achieve a targeted predetermined pressure, a strapping material 708 (e.g., a set of straps; as illustrated, one or more bands/loops) may be placed around the compressed cell-stack 702 to hold/secure the cell-stack 702 at the desired thickness/compression; thereby achieving and maintaining the target pressure. The strapping material 708 may be fabricated from one or more materials of appropriate mechanical properties, such as aramid, plastic polymer, including polyester, polyethylene, polypropylene, polystyrene, vinyl (e.g., polyvinyl chloride (PVC)), nylon, rubber, etc. As required, other features and/or materials may be added to the strapping materials to affix the strap, including but not limited to adhesive, bracketry, ratchet, and/or clasp to join the strap to itself or to the endplates to create the required tension loop. In other words, the strapping material 708 is in lieu of the battery enclosure 516. Furthermore, the enclosure may be fabricated using multiple shapes and need not be fabricated as a single enclosure, rather it may employ multiple individual sleeves having a narrow width, such as the bands/straps.

Accordingly, where the composite-fiber compression sleeve 600a has a variable enclosure length, an additional step may be added to the above-described two-step method or process. Specifically, a strapping material 708 may be secured around the cell-stack 702 prior to inserting the compressed cell-stack 702 into the battery enclosure, wherein the strapping material 708 is configured to maintain a predetermined pressure on the cell-stack.

Any patents, patent publications, or articles cited herein are hereby incorporated by reference in their entirety. It will be appreciated that the methods and systems described above are set forth by way of example and not of limitation. Numerous variations, additions, omissions, and other modifications will be apparent to one of ordinary skill in the art. Variations of the foregoing may include: alternate materials, thicknesses, ply count, and/or fiber direction to achieve design elasticity; variation in sleeve geometry and cross section; variation in stiffened geometry and cross section; and variation in sleeve alignment and parallelism. In addition, the order or presentation of method steps is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A battery pack comprising:
   a composite-fiber-compression sleeve impregnated with a plurality of primary fibers that defines a direction of a tensile strength for the composite-fiber-compression sleeve; and
   a plurality of battery cells stacked to define a cell-stack, wherein the composite-fiber-compression sleeve encloses the cell-stack such that the direction of the tensile strength is parallel to a direction of a primary fiber load for the plurality of primary fibers and the composite-fiber-compression sleeve applies a predetermined pressure upon the cell-stack to compress the cell-stack in the direction of the tensile strength for the composite-fiber-compression sleeve.

2. The battery pack of claim 1, wherein the composite-fiber-compression sleeve applies the predetermined pressure transversely from a first end to a second end of the cell-stack.

3. The battery pack of claim 2, wherein each of the first end and the second end of the cell stack comprises a rigid end-plate.

4. The battery pack of claim 1, wherein the plurality of primary fibers is oriented parallel with a load path imparted on the cell-stack by the composite-fiber-compression sleeve.

5. The battery pack of claim 1, wherein the cell-stack further comprises a plurality of distributed cell spacers.

6. The battery pack of claim 5, wherein the plurality of distributed cell spacers is interleaved with the plurality of battery cells such that the cell-stack alternates between battery cells and cell spacers.

7. The battery pack of claim 5, wherein each of the plurality of distributed cell spacers is fabricated from a compliant material.

8. The battery pack of claim 5, wherein each of the plurality of distributed cell spacers comprises silicone foam rubber, polyolefin foam, or polyurethane foam.

9. The battery pack of claim 1, wherein the composite-fiber-compression sleeve comprises a tension material in an hour-glass shape.

10. The battery pack of claim 1, wherein each of the plurality of battery cells is a lithium polymer pouch.

11. The battery pack of claim 10, wherein the plurality of battery cells are electrically coupled to one another to yield, in aggregate, a first nominal voltage.

12. The battery pack of claim 11, wherein the plurality of battery cells are electrically coupled to one another using a printed circuit board (PCB).

13. The battery pack of claim 11, wherein the battery pack is electrically coupled with a second battery pack to define a battery pack assembly having a second nominal voltage that is greater than the first nominal voltage.

14. The battery pack of claim 13, wherein the battery pack assembly comprises a battery pack controller configured to monitor each of the battery pack and the second battery pack.

15. The battery pack of claim 13, wherein the battery pack assembly is electrically coupled with a solar panel, wherein the solar panel is configured to charge the battery pack assembly.

16. A battery pack assembled by a method comprising:
compressing a cell-stack to a predetermined pressure, wherein a plurality of battery cells is stacked to define the cell-stack; and
inserting, into a composite-fiber-compression sleeve, the cell-stack while maintaining the predetermined pressure, wherein the composite-fiber-compression sleeve is impregnated with a plurality of primary fibers that defines a direction of a tensile strength for the composite-fiber-compression sleeve, the direction of the tensile strength is parallel to a direction of a primary fiber load for the plurality of primary fibers, and the composite-fiber-compression sleeve applies a predetermined pressure upon the cell-stack to compress the cell-stack in the direction of the tensile strength for the composite-fiber-compression sleeve.

17. The battery pack of claim 16, wherein the cell-stack comprises a plurality of distributed cell spacers interleaved with the plurality of battery cells such that the cell-stack alternates between battery cells and cell spacers, wherein each of the plurality of distributed cell spacers is fabricated from a compliant material.

18. The battery pack of claim 17, wherein each of the plurality of distributed cell spacers comprises silicone foam rubber, polyolefin foam, or polyurethane foam.

19. The battery pack of claim 16, wherein the composite-fiber-compression sleeve comprises a tension material in an hour-glass shape.

20. The battery pack of claim 16, wherein each of the plurality of battery cells is a lithium polymer pouch and the plurality of battery cells are electrically coupled to one another to yield, in aggregate, a first nominal voltage.

* * * * *